United States Patent [19]

Buchan et al.

[11] 3,946,503

[45] Mar. 30, 1976

[54] AUDIO-VISUAL APPARATUS AND METHOD OF USING THE APPARATUS FOR OBTAINING COMPUTER COMPATIBLE DATA FROM AN INDIVIDUAL

[75] Inventors: Robert R. C. Buchan, Troy; Robert W. Kirchgessner, Jr., Dayton, both of Ohio

[73] Assignee: Robert R. C. Buchan, Troy, Ohio

[22] Filed: Mar. 20, 1974

[21] Appl. No.: 452,976

[52] U.S. Cl. .................................. 35/9 A; 35/48 R
[51] Int. Cl.² ........................................ G09B 7/08
[58] Field of Search.......... 35/6, 8 R, 8 A, 9 R, 9 A, 35/9 B, 35 C, 48 R; 360/55

[56] References Cited
UNITED STATES PATENTS

| | | | |
|---|---|---|---|
| 3,210,864 | 10/1965 | Tillotson et al. | 35/9 A |
| 3,269,033 | 8/1966 | Redfield et al. | 35/35 C |
| 3,500,559 | 3/1970 | Jones et al. | 35/48 R |
| 3,584,396 | 11/1968 | Hannah et al. | 35/9 A |
| 3,605,285 | 9/1971 | Bendaniel et al. | 35/8 A |
| 3,662,121 | 5/1972 | Cruger | 35/35 C |
| 3,718,985 | 3/1973 | Hewitt | 35/9 A |
| 3,718,986 | 3/1973 | Hewitt | 35/9 A |
| 3,735,503 | 5/1973 | Dow | 35/9 A |

*Primary Examiner*—Anton O. Oechsle
*Assistant Examiner*—Vance Y. Hum
*Attorney, Agent, or Firm*—Jacox & Meckstroth

[57] ABSTRACT

An audio-visual unit presents a series of questions and corresponding multiple choice answers on a viewing screen in response to a series of pulses recorded on an audio magnetic tape. When each question is presented, a tone is generated for actuating a question counter, and the tone is automatically recorded on a magnetic tape cassette. An answer is selected by manually actuating a corresponding answer switch which causes a specific differential tone to be generated and also recorded on the magnetic tape cassette. The cassette recorder is momentarily actuated for the recording of each tone and has a series of lights which indicate the corresponding selected answer during both recording and playback. The electrical circuit also provides for quickly bypassing a series of subordinate questions of a program if a particular answer is selected to a primary problem question. The apparatus further includes a unit for transmitting the condensed recorded tones corresponding to the questions and selected answers at a high speed over a data phone set connected to a remote computer.

6 Claims, 4 Drawing Figures

U.S. Patent  March 30, 1976  Sheet 1 of 2  3,946,503
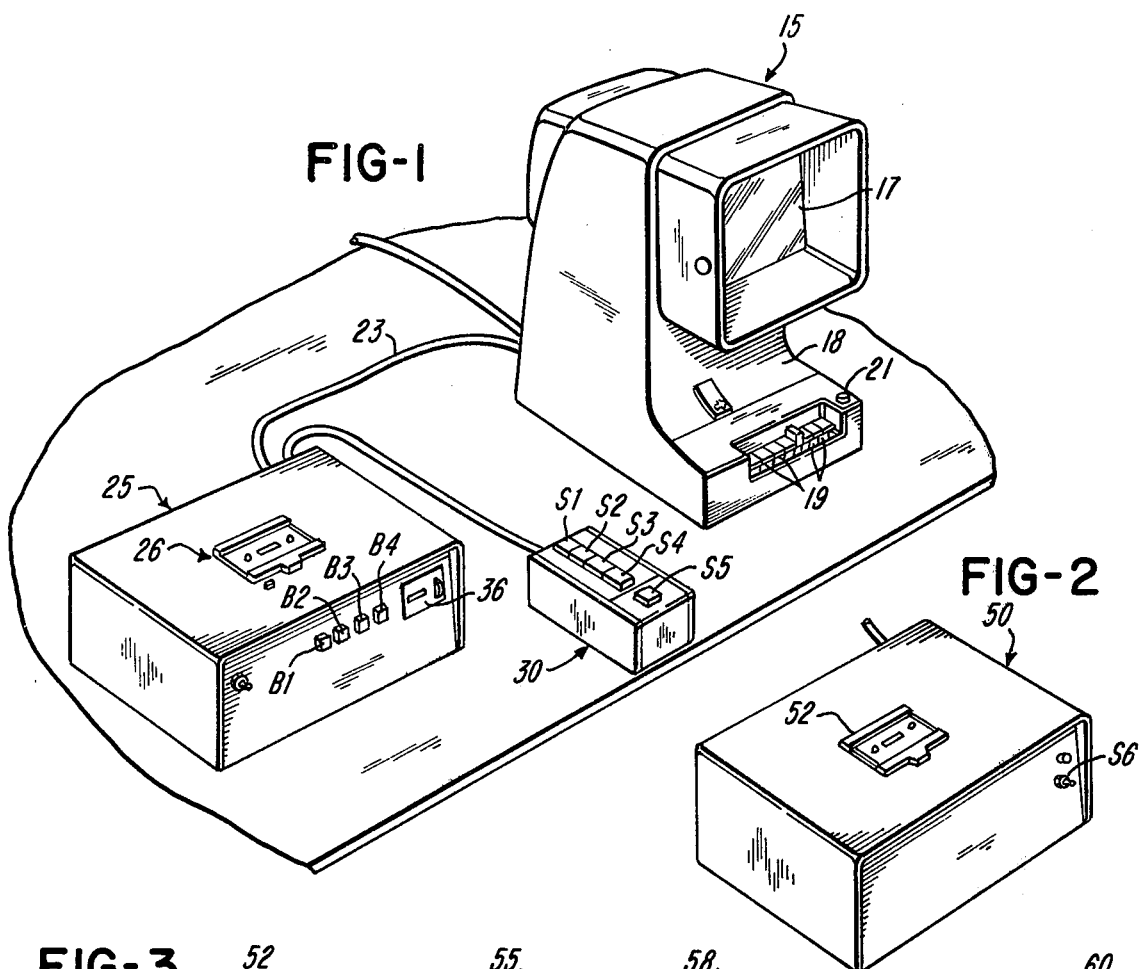
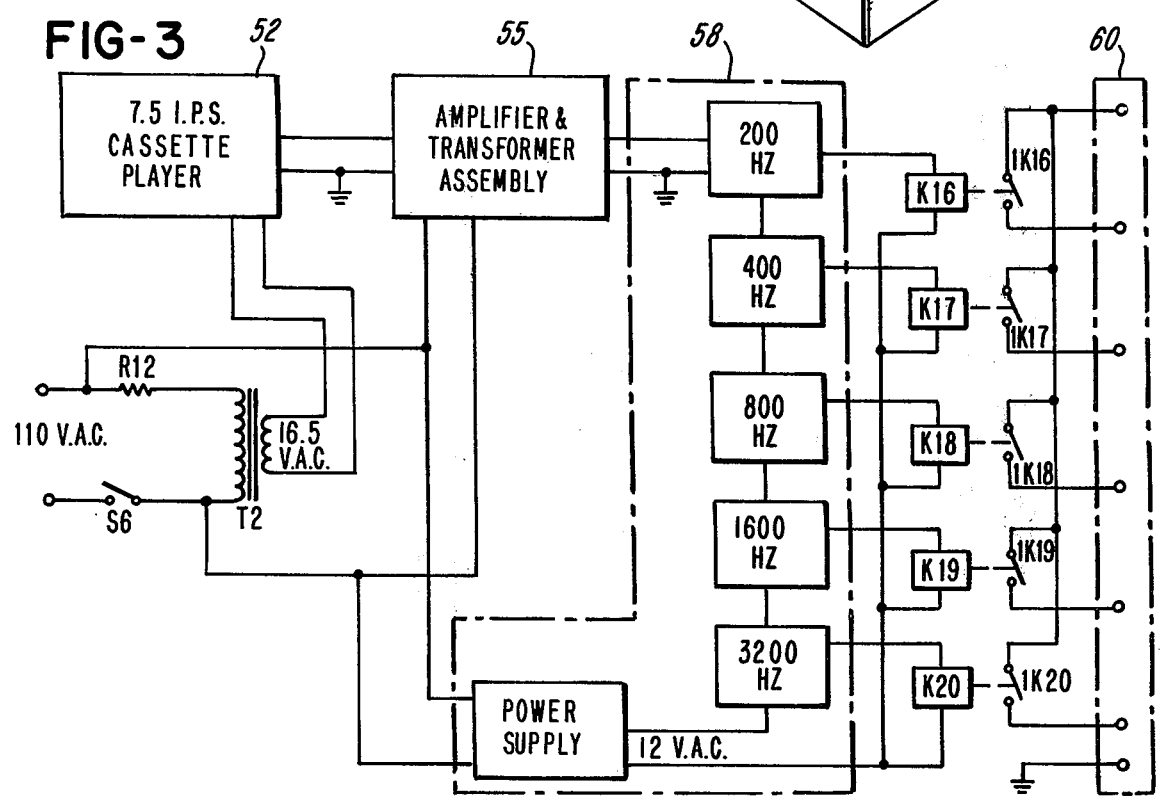

AUDIO-VISUAL APPARATUS AND METHOD OF USING THE APPARATUS FOR OBTAINING COMPUTER COMPATIBLE DATA FROM AN INDIVIDUAL

BACKGROUND OF THE INVENTION

In the practice of medicine and dentistry, audio-visual equipment has been used for presenting programs to a patient to inform or advise the patient in regard to a particular medical or dental problem. For example, audio-visual programs have been used to educate a patient to the potential risks of any surgical procedure and with regard to preparing for a specific surgical operation or caring for a particular area of the body such as the proper way to brush and clean teeth or to use and care for contact lenses. Such audio-visual programs are normally presented to a patient at the physician's office.

It has also been found desirable to use audio-visual equipment for obtaining a patient's medical history with or without requiring an attendant nurse or physician, and for clearly informing a patient or the person responsible for the patient of the details in regard to a particular surgical operation prior to obtaining consent for such operation. In the use of audio-visual programs for obtaining a patient's medical history or for obtaining informed consent for general or specific use, it is necessary to have the patient participate by answering questions presented by an audio-visual program and to analyze answers to the questions in a rapid and efficient manner. In addition, the effectiveness of the informative or educational presentations can be evaluated, by response, for practical and research purposes.

One form of an audio-visual unit which provides desirable features is manufactured and marketed by the North American Phillips Corporation under the trademark of Norelco. The unit is also referred to as the "Pip" audio-visual cassette system and uses separate cassettes for the synchronized audio and visual programs. The visual program is presented by a "super 8"m.m. film roll and the audio tape is recorded with inaudible signals or pulses which control selective advancement of the film. The film may be moved either in increments of one frame or at any rate or multiple of up to 24 frames per second to provide a display of either single frame or natural motion on the viewing screen. A single fifty foot film strip is commonly used in the unit and provides up to 3,600 or more frames for any type program. The audio portion of a program is provided on a tape cassette, thereby presenting pertinent audible narrative.

SUMMARY OF THE INVENTION

The present invention is directed to an improved audio-visual and differential recording apparatus which is ideally suited for quickly and efficiently obtaining information or data from a medical patient or other individual, and for educating the patient or individual. The apparatus is also adapted to be used as an off-line computer terminal and provides for recording the data in a condensed form which can be quickly transmitted by mail or by a data phone set to a remotely located computer programmed to process the data. In addition, the apparatus provides for an immediate and rapid review of the patient's or individual's answers or responses. However, it is to be understood that the apparatus and method of the invention may also be used for educating and obtaining information or data from other individuals who are not medical patients.

The apparatus of the invention provides for substantial flexibility in presenting a series of questions either orally by an audio tape cassette or visually by projecting the questions onto a rear projection viewing screen along with a series of corresponding multiple choice answers. The apparatus also provides for conveniently selecting an answer to each question and for recording sequentially on a separate magnetic tape cassette those tones which correspond to the questions and those differential tones which correspond to the selected answers. According to the embodiment illustrated, the recording of each signal is accomplished by starting a tape cassette recorder only momentarily to record the signal. The cassette recorder unit which records the signals corresponding to the questions and selected answers, may also be used for monitoring the selected answers to the questions or during playback, provides a condensed visual display of the selected answer for each question presented.

The preferred form of audio-visual unit uses separate audio and visual tape cassettes and preferably has the capability of presenting the visual portion of a program at a variable rate of between one frame at a time and a rate whereby a continuous series of frames illustrates natural movement such as, for example, is mentioned above in reference to the "Pip" system. The audio-visual unit is connected to the cassette tape recorder and a control unit having a set of answer selection control switches. In accordance with the illustrated embodiment, one tone is recorded on the tape cassette when each question is asked and that tone also actuates a counter which counts the question presented. Each question tone is followed by a different tone which corresponds to the answer selected by actuating the corresponding control switch. The apparatus also provides for bypassing a series of subordinate or branching sequences of questions in response to the selection of a predetermined answer to a primary question.

Other features and advantages of the invention will be apparent from the following description, the accompanying drawings and the appended claims.

BRIEF DESCRIPTION OF THE DRAWINGS

FIG. 1 is a perspective view of a system including an audio-visual unit, a tape recorder unit and an answer selection control unit which are constructed and assembled in accordance with the invention;

FIG. 2 is a perspective view of a high speed tape cassette player unit also constructed in accordance with the invention and adapted for transmitting recorded tones or signals over a data phone set;

FIG. 3 is an electrical schematic diagram of the components incorporated within the cassette player unit shown in FIG. 2.

DESCRIPTION OF THE PREFERRED EMBODIMENT

Figure 4:
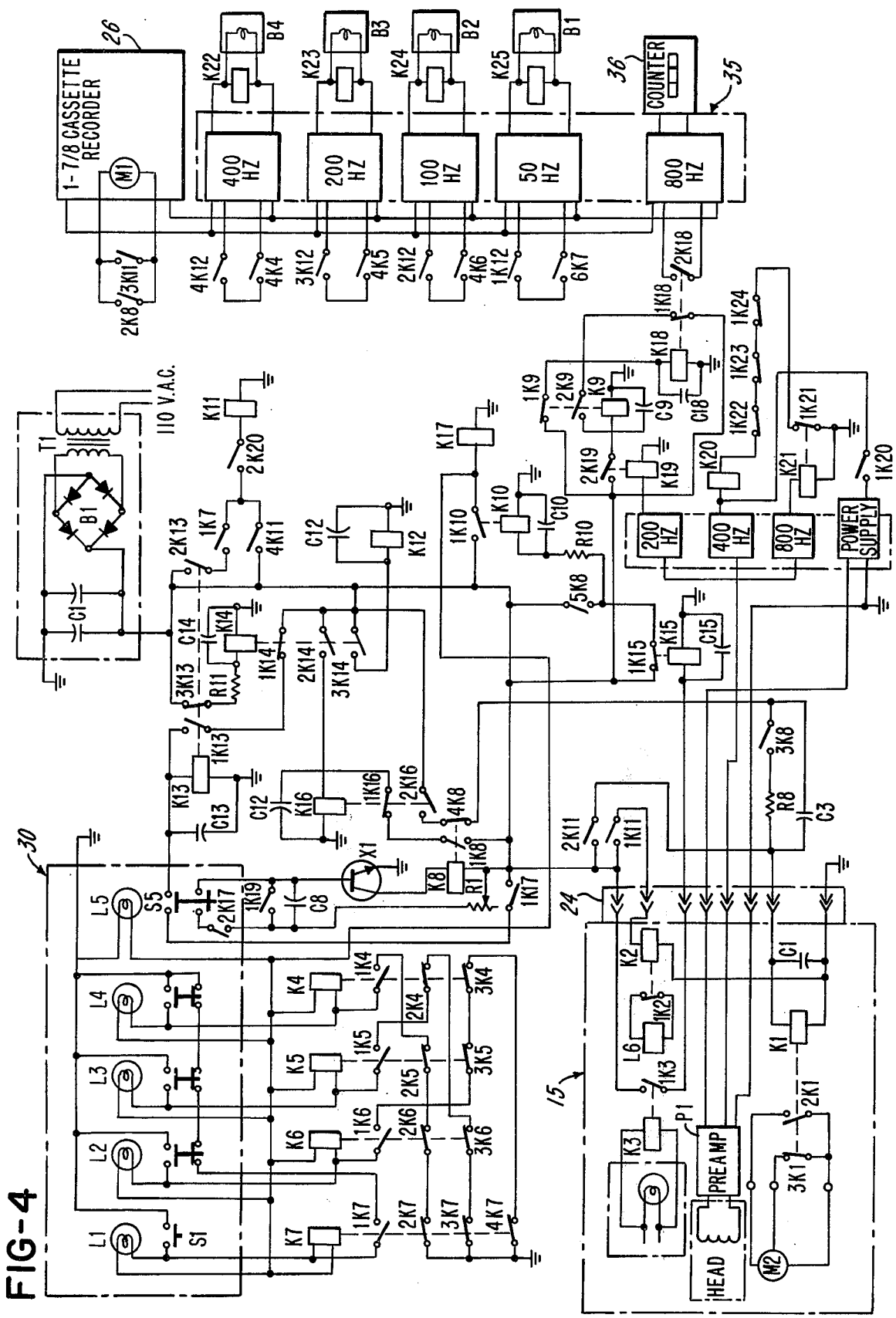
FIG. 4 is an electrical schematic diagram illustrating the connection of the components used in the system shown in FIG. 1.

Referring to FIG. 1, the audio-visual recording system or apparatus of the invention is illustrated, as an example, in connection with an audio-visual unit 15 which is manufactured by North American Phillips Corporation, as mentioned above, and sold under the trademarks "Norelco" and "Pip". In general the unit 15 includes a rear projection viewing screen 17 and is adapted to receive separate audio and visual cassettes which are located under a sliding access door 18. The visual cassette includes a fifty foot "super 8" mm film strip, and the audio cassette incorporates a sixty minute ¼ inch magnetic tape. The projection of the visual program from the film strip onto the screen 17 is controlled by inaudible frequencies or pulses which are recorded on the audio cassette. Independent advancement or rewinding of the cassettes may be separately controlled by depressing a set of push button control switches 19, if necessary.

The audio program is prerecorded with a series of advance and stop pulses. When a stop pulse is sensed, both the audio and visual cassettes within the unit 15 are automatically stopped with a frame image being projected onto the screen 17, and a lamp 21 (FIG. 1) is energized to provide a visual indication that the unit awaits a command to proceed. For purposes of illustration, it is assumed that the program for the video cassette consists of a series of questions and multiple choice answers with one question and a corresponding set of multiple choice answers being visually presented by one frame of the film strip. A question may also be presented orally by the audio tape, according to the desired programming.

As illustrated in FIG. 1, the audio-visual unit 15 is connected by a multiple conductor electrical cable 23 and a plug connector 24 (FIG. 4) to a cassette recorder and playback unit 25. Both of the units 15 and 25 are remotely controllable by a control box or unit 30 which is normally positioned near the audio-visual unit 15 so that the patient or other individual viewing the screen 17 can also operate the control unit 30. The recorder unit 25 incorporates a No. 1623 play back cassette recorder 26 which is manufactured by the V-M Corporation of Benton Harbor, Michigan. However, other commercially available recorders may be used.

Referring to the schematic electrical diagram of FIG. 4, a portion of the electrical control components within the audio-visual unit 15 are enclosed within a box illustrated by the reference number 15. The components within the control unit 30 are enclosed with a box illustrated by the reference number 30 and the remaining components shown in FIG. 4 are enclosed within the cassette recorder unit 25.

Thus referring to the audio-visual unit 15, the existing or standard two track play head within the unit 15 is replaced with a four track head H, and tracks one and two are connected to the existing electronics within the unit 15. A preamp circuit P1 is installed within the unit 15 for contacting track four to the control circuit in the unit 25, as shown in FIG. 4. This allows the unit 15 to operate according to its original design specifications as well as producing a control track for the unit 25. The new audio cassette used on the modified Pip unit 15 is recorded with the audio on track number one and the film advance control pulses on track number two. Track number three is blank, and track number four is used to record three tones. The first tone of 200 Hz indicates that a question has been asked, and a second tone of 400 Hz indicates that the question is a primary question. The third tone of 800 Hz indicates that a primary question and all subordinate questions are completed.

When a question is asked by the presentation of a frame on the screen 17, a 200 Hz tone on track number four is sensed and energizes relay K19 to shunt capacitor C8 by closing of contacts 1K19. The capacitor C8 activates transistor X1 which energizes relay K8 thus closing contacts 2K8 starting the motor M1 of the cassette recorder 26. The energizing of relay K19 also closes contacts 2K19 to energize relay K9 which opens contacts 1K9 for starting a time delay at relay K18 by capacitor C18 discharging through the coil of relay K18. Relay K9 also closes contacts 2K9 thus holding relay K9 in an energized condition with a positive voltage supplied through contacts 1K18 and 2K9 to the coil of relay K9.

When the time delay is completed, relay K18 relaxes and closes contacts 2K18 to energize the 800 Hz tone circuit forming a part of an integrated circuit tone generator unit 35 manufactured by Columbia Scientific Industries. The 800 Hz tone is sent to the recorder 26 for placing a 800 Hz tone on the tape and thereby indicate that a question has been asked. The 800 Hz tone also advances by one number an electrically actuated digital counter 36 (FIG. 4) positioned on the front of the unit 25. After relay K18 relaxes, relay K9 relaxes and then relay K18 resets so that the circuit returns to a question indicated condition. Relay K8 relaxes and awaits the next 200 Hz tone. The total operation takes 0.5 second and occurs anytime a 200 Hz tone is sensed.

When a film stop pulse on tape track two is sensed by unit 15, the light indicator 21 energizes, and the unit 15 will stop the audio tape by deenergizing the motor M2 within the Pip unit 15. When lamp 21 is energized, relay K3 is also energized, closing contacts 1K3 and energizing relay K15. Contacts 1K15 open and start a time delay of 0.3 second on relay K10 and capacitor C10. When relay K10 relaxes, a positive voltage is applied through contacts 1K10 to relay K17 and to a lamp L5 located within a corresponding double pole, double throw push button switch S5 within the control box 30. The voltage is also applied to switches S1, S2, S3 and S4 within control box 30. When relay K17 is energized, it closes contacts 1K17 and applies a positive voltage to switch S5. Contacts 2K17 close the circuit to capacitor C8 so that the control box 30 is operational and the patient may select any answer 1, 2, 3 or 4 and proceed to the next question.

Preferably, four multiple choice answers are presented, and the light indicating switches S1–S4 are provided with the numbers 1–4, corresponding to the four multiple choice answers. Due to the interconnection of the switches S1–S4 and the corresponding relays K7, K6, K5 and K4, only one answer may be selected. When the patient is satisfied with the answer which he selected by depressing the corresponding switch S1–S4, he then depresses switch S5.

When switch S5 is depressed, it also shorts out capacitor C8 at transistor X1 and thereby energizes relay K8 to close contacts 2K8 for energizing the tape cassette recorder motor M1 for a time interval of one second. The closing of switch S5 also applies a positive voltage to relay K13 which opens contacts 3K13 and deenergizes relay K14 which is normally energized. This starts the 0.5 second time delay which is controlled by the capacitor C14 discharging through relay K14.

When relay K14 relaxes, relay K12 is energized for 0.3 seconds. Depending upon which push button switch S1–S4 was depressed according to the selected answer, the corresponding tone generator is produced within the tone generator unit 35, and the tone corresponding to the selected answer is sent to the cassette recorder 0.5 seconds after the recorder motor M1 is energized.

When relay K14 relaxes, it also relaxes relay K13 by opening of contacts 1K14. Relay K16 is energized by the closing of contacts 2K14 and due to relay K8 being energized. This charges capacitor C16, and the closing of contacts 3K8 shorts out capacitor C3 through resistor R8 so that the capacitor C3 is discharged.

If the question is not a primary question, when an answer is selected by depressing of the corresponding switch S1–S4, relay K8 will relax one second after being energized. When relay K8 relaxes, relay K16 holds for 0.3 seconds so that a positive voltage is sent through contact 4K8 to capacitor C3. This causes relay K1 to be energized for 0.3 seconds so that contacts 2K1 are closed and contacts 3K1 are opened to actuate the controller M2 of the audio-visual unit 15. This actuation of the unit 15 deenergizes the light 21 and causes the audio-visual program to continue. Also when relay K8 relaxes, the recorder motor M1 stops by opening of contacts 2K8. During this portion of the cycle, the corresponding answer indication light B1–B4 located on the front of the cassette recorder unit 25 will be energized momentarily to indicate the answer which has been selected on the unit 30. Thus the digital counter 36 and the answer indication lights B1–B4 may be used for monitoring the responses of the patient or individual participating in the program.

When a primary question is asked, it will be followed by one or more secondary questions and may be used at any time. A "no" answer to a primary question is always indicated by closing switch S1. A primary question is indicated by a 400 Hz tone recorded on track number four of the control cassette within the unit 15. The end of a sequence of primary and subordinate or secondary questions is indicated by an 800 Hz tone recorded on track number four of the control cassette within unit 15. As mentioned above, when a question is asked, the 200 Hz tone is recorded on track number four. If a 400 Hz tone is sensed at the same time, relay K20 energizes, and contacts 1K20 hold the relay in an energized condition. The closing of contacts 2K20 also connects relay K11 to open contacts 1K7 and 4K11.

If a "no" answer is selected by closing switch S1 and then depressing switch S5, a positive voltage will pass through contacts 1K13 so that relay K13 is energized. Closed contacts 1K7, 2K13 and closed contacts 2K20 will energize relay K11 so that contacts 4K11 hold relay K11 energized until contacts 2K20 are opened. The energizing of relay K11 also closes contacts 3K11 which hold the recorder motor M1 in a run condition. The closing of contacts 2K11 applies a positive voltage on relay K11 to close contacts 2K1 and open contacts 3K1 thereby bypassing any further stop pulses from unit 15. The closing of contacts 1K11 places a positive voltage on relay K2 opening contacts 1K2 to deenergize the projection lamp L6 within the unit 15 so that no visual indication is seen by patient when a series of secondary questions are being by-passed.

The depressing of switch S5 again completes the sequence as discussed above. In this bypass condition, the control box 30 is inoperative, and light 21 will not come on. Each time a 200 Hz tone is sensed on track number four, a question will be counted, thus bypassing all subordinate questions. Since a "no" answer to a primary question is always selected by depressing switch S1, when a "no" answer is selected, the next primary question is presented on the screen 17.

One second prior to the presentation of the next primary question, a 800 Hz tone is recorded on cassette track number four. This tone is sensed by the control circuit for energizing relay K21 to open contact 1K21 thereby opening the ground circuit to relay K20 and allowing it to relax and open contacts 1K20 and 2K20. Removing the positive voltage from relay K11 opens contacts 1K11 to relax relay K2 and reenergize the projection lamp L6. The opening of contacts 2K11 removes the positive voltage from relay K1 and allows the unit 15 to accept stop pulses. Opening contacts 3K11 stops the recorder motor M1 and opens contacts 4K11. All circuits return to the normal condition, waiting on the next command. If an answer 2, 3 or 4 is selected by depressing the corresponding switch S2, S3 or S4, and then depressing switch S5, either relay K22 or K23 or K24 will energize. This opens contacts 1K22 or 1K23 or 1K24 and opens the ground circuit of relay K20 which deenergizes and permits subordinate questions to be asked by the unit 15 in a normal sequence.

It is apparent from FIG. 4 that power is supplied to the units 25 and 30 from the power supply which includes a transformer T1, a bridge circuit B1 and a pair of capacitors C1. The value of the variable resistor R1 is 100K ohms, and each of the resistors R8, R10 and R11 has a resistance of 100 ohms and a power consumption of ½ watt. The values of the capacitors at 35 V.D.C. are as follows:

| C1 | 500 MFD | C10 | 25 MFD | C15 | 10 MFD |
| C3 | 25 MFD | C12 | 75 MFD | C16 | 10 MFD |
| C8 | 15 MFD | C13 | 10 MFD | C18 | 100 MFD |
| C9 | 25 MFD | C14 | 50 MFD | | |

After the desired number of questions presented by the audio-visual unit 15 have been answered by depressing one of the switches S1–S4 of the control unit 30 for each question and followed by depressing the switch S5, the condensed question and answer tones recorded on the tape cassette within the unit 25, may be played back on the unit 25. This is accomplished simply by rewinding the tape cassette on the unit 25, resetting the counter 36 to zero and then actuating the unit 25 in a play position. The tones on the tape corresponding to the questions presented, will be counted and displayed on the digital counter 36, and for each question, one of the lamps B1–B4 on the front of the unit 25 will be energized, indicating the selected answer to the question.

Referring to FIGS. 2 and 3, a tape cassette which is recorded on the recorder unit 25 with the different frequency pulses tones corresponding to the questions and answers, may also be placed on a transmitter unit 50 which is constructed so that it may be connected directly with a Bell System dataphone set 402C (not shown) manufactured by the American Telephone and Telegraph Company. The unit 50 includes a tape cassette player 52 which operates at a speed of 7.5 inches per second which is four times the recording speed of 1⅞ inches per second of the cassette recorder 26 within the recorder unit 25. The cassette player 52 receives a 16.5 V.A.C. power supply from a transformer T2 which has its primary winding connected to a 110 V.A.C. power supply through a resistor R12 and a control switch S6. The output of the cassette player 52 connects with an amplifier assembly and transformer 55.

As a result of the higher speed of the cassette player 52, the tone receiver 58 receives tone frequencies of 200 Hz, 400 Hz, 800 Hz, 1600 Hz, and 3200 Hz in response to the recorded tone frequencies of 50 Hz, 100 Hz, 200 Hz, 400 Hz, and 800 Hz. The tone receiver 58 is operated by a 12 V.A.C. power supply and effects energizing of the corresponding relays K16 and K20 for closing the corresponding contacts which connect with a plug connector 60 adapted to couple the transmitter unit to the 402 C dataphone set mentioned above.

The transmitter unit 50 and the 402C dataphone set are used when it is desired to transmit the condensed tones corresponding to the questions asked and the corresponding selected answers to a remotely located computer which is provided with a program for receiving and analyzing the coded tones. For example, if the series of questions and multiple choice answers presented by the audio-visual unit 50 consist of a program for obtaining the medical history of a patient, it may be desirable to have the questions and selected answers processed through a computer as quickly as possible so that the results are obtained by the patient's physician with minimum delay to assist him in treating the patient. Of course, the tape cassette recorded with the tones corresponding to the questions and selected answers, may also be mailed to the computer center for processing.

From the drawings and the above description, it is apparent that the apparatus of the invention provides desirable features and advantages. For example, the units 15, 25 and 30 cooperate to provide an economical off-line computer terminal for accumulating information or data from a patient or other individual. As mentioned above, the system may be used with an audio-visual program which is prepared to obtain a medical history from a patient or to inform a patient with respect to the details of a medical operation prior to obtaining his consent for the operation, or to present a variety of other education and/or data collecting programs.

The apparatus also provides for obtaining a patient's or individual's responses or answers in a condensed electrically coded form on a simple tape cassette. The cassette may be conveniently mailed to a prearranged data processing computer center or may be quickly transmitted to the computer center by mail or with the use of the transmitter unit 50 and a commercially available dataphone set. The recorder unit 25 may also be remotely located and monitored while a series of questions are being presented and answered, or may be used as a playback unit when it is desired to minimize the time for reviewing the questions and selected answers by observing the digital question counter 36 and the flashing of the lamps B1–B4 on the front of the recorder unit 25.

Another important feature is provided by the use of the audio-visual unit 15 for presenting an audio-visual program to a patient or other individual. For example, the unit 15 provides flexibility in the presentation of questions and multiple choice answers since the audio and visual portions of the program are recorded on separate cassettes. For example, one prerecorded film program on the film cassette may be used in conjunction with different audio cassettes to provide for bypassing various selected groups of questions and corresponding multiple choice answers on the video or film strip. The unit 15 also provides for presenting a substantial number of questions since the 8 m.m. film strip provides up to 3600 or more frames.

While the method and form of apparatus herein described constitute a preferred embodiment of the invention, it is to be understood that the invention is not limited to the precise method and form of apparatus described, and that changes may be made therein without departing from the scope and spirit of the invention as defined in the appended claims.

The invention having thus been described, the following is claimed:

1. In apparatus for presenting a series of questions and corresponding multiple choice answers in incremental sequence to an individual and for recording his selected answer, and comprising an audio-visual unit including a magnetic tape player, a magnetic tape on said tape player and having a prerecorded audio program, said audio-visual unit further including a screen and a visual program incorporating a series of written questions and corresponding multiple choice answers for projecting onto the screen, the visual program being controlled by a series of electrical signals prerecorded on the magnetic tape which carries the audio program, means for producing an electrical pulse signal corresponding to each question presented, signal generating means for producing different electrical pulse signals corresponding to the multiple choice answers, the pulse signals for the answers also being different from the pulse signal for each question, and control means connected to operate said signal generating means to provide for selecting an answer and to produce a corresponding electrical pulse signal for the selected answer, the improvement comprising a magnetic tape recorder unit separate from said tape player and connected to record the pulse signal corresponding to the presentation of each question and the pulse signal generated in response to the selection of an answer, means for automatically and momentarily starting said tape recorder unit in response to the presentation of each question on said audio-visual unit and in response to the selection of an answer to effect recording of the corresponding pulse signals, time delay means for momentarily delaying the recording of each pulse signal until after said tape recorder unit is started, and means for automatically stopping said tape recorder unit immediately after each signal is recorded to produce a magnetic tape record of condensed different electrical pulse signals corresponding to the questions and selected answers.

2. Apparatus as defined in claim 1 wherein said audio-visual unit is effective to display a series of frames presented on a continuous film strip, and said audio program is effective to advance the strip in increments of one frame or at a variable rate up to a predetermined speed which causes the individual frames to provide the appearance of motion, and said control means is also connected to control the starting of said audio-visual unit after each question is answered.

3. Apparatus as defined in claim 1 wherein said control means comprise a plurality of manually actuated answer selection switches corresponding to the multiple choice answers presented by said audio-visual unit, and a manually actuated recording switch which is effective to actuate said signal generating means and said recording means after one of said answer selection switches is actuated.

4. In apparatus for presenting a series of questions and corresponding multiple choice answers in incremental sequence to an individual and for recording his selected answer, and comprising an audio-visual unit including a magnetic tape player, a magnetic tape on said tape player and having a prerecorded audio program, said audio-visual unit further including a screen and a visual program incorporating a series of written questions and corresponding multiple choice answers for projecting onto the screen, the visual program being controlled by a series of electrical signals prerecorded on the magnetic tape which carries the audio program, means for producing an electrical pulse signal corresponding to each question presented, signal generating means for producing different electrical pulse signals corresponding to the multiple choice answers, the pulse signals for the answers also being different from the pulse signal for each question, and control means connected to operate said signal generating means to provide for selecting an answer and to produce a corresponding electrical pulse signal for the selected answer, the improvement comprising a magnetic tape recorder unit separate from said tape player and connected to record the pulse signal corresponding to the presentation of each question and the pulse signal generated in response to the selection of an answer, means for automatically and momentarily starting said tape recorder unit in response to the presentation of each question on said audio-visual unit and in response to the selection of an answer to effect recording of the corresponding pulse signals, time delay means for momentarily delaying the recording of each pulse signal until after said tape recorder unit is started, means for automatically stopping said tape recorder unit immediately after each signal is recorded to produce a magnetic tape record of condensed electrical pulse signals corresponding to the questions and selected answers, and means associated with said tape recorder unit for bypassing the recording of a series of pulse signals in response to selecting a predetermined answer.

5. A method for presenting a series of questions and corresponding multiple choice answers in incremental sequence to an individual and for recording his selected answer, comprising the steps of preparing an audio-visual program with a series of questions and corresponding multiple choice answers, successively presenting the questions and corresponding multiple choice answers to the individual with an audio-visual unit, recording on the audio portion of the audio-visual program a series of electrical signals which control the advancement of the visual portion of the program, producing an electrical pulse signal for each question presented by the audio-visual unit and providing for producing other selectable different corresponding electrical pulse signals for the multiple choice answers, selecting and producing one of said other pulse signals corresponding to a selected answer, automatically and momentarily starting a magnetic tape recorder in response to the corresponding pulse signals generated by each question presented by said audio-visual program and by each selected answer, automatically recording on the magnetic tape within said recorder the corresponding pulse signals generated for each question presented and for each answer selected, momentarily delaying the recording of each pulse signal until after the tape recorder is started, and automatically stopping the recorder immediately after each pulse signal is recorded to produce a condensed magnetic tape record of electrical pulse signals corresponding to the questions and selected answers.

6. A method as defined in claim 5 including the step of bypassing the recording of pulse signals corresponding to one or more subordinate questions presented by said audio-visual program in response to selecting a predetermined answer to a primary question presented by said audio-visual program.

* * * * *